United States Patent
Buri et al.

[11] Patent Number: 5,921,137
[45] Date of Patent: Jul. 13, 1999

[54] AXIAL SUPPORT FOR VEHICLE GEARBOXES WITH HELICAL GEAR

[75] Inventors: Gerhard Buri, Markdorf; Josef Bader, Friedrichshafen, both of Germany

[73] Assignee: ZF Friedrichshafen AG, D-88038 Friedrichshafen, Germany

[21] Appl. No.: 08/910,958

[22] Filed: Aug. 7, 1997

[30] Foreign Application Priority Data

Aug. 19, 1996 [DE] Germany ............... 196 33 279

[51] Int. Cl.⁶ .................... F16H 3/38; F16D 21/02
[52] U.S. Cl. ............ 74/339; 74/410; 192/48.8; 192/110 B
[58] Field of Search ............... 74/339, 359, 410, 74/331, 325, 333; 192/48.8, 110 B, 110 S

[56] References Cited

U.S. PATENT DOCUMENTS

| | | | |
|---|---|---|---|
| 2,753,728 | 7/1956 | Kelbel | 74/359 |
| 3,048,247 | 8/1962 | Cook et al. | 74/339 |
| 3,910,131 | 10/1975 | Richards | 74/339 X |
| 4,458,546 | 7/1984 | Schreiner et al. | 74/331 |
| 4,624,352 | 11/1986 | Yarnell | 74/339 X |
| 4,964,313 | 10/1990 | Davis | 74/339 X |
| 5,462,148 | 10/1995 | Azuma et al. | 74/339 X |

FOREIGN PATENT DOCUMENTS

| | | |
|---|---|---|
| 2 419 673 | 11/1974 | Germany . |
| 30 49 101 C2 | 7/1982 | Germany . |
| 41 29 231 A1 | 3/1993 | Germany . |

*Primary Examiner*—John A. Jeffery
*Assistant Examiner*—Marcus Charles
*Attorney, Agent, or Firm*—Davis and Bujold

[57] ABSTRACT

The invention describes a vehicle transmission (2) with helical toothing wherein a first shaft (4, 60, 100, 104, 160, 162, 220, 300) and one substantially coaxial second shaft (28, 62, 102, 180, 246, 302) have a mechanism (36–50, 76–84, 120–154, 226, 234, 244, 306) between them for the transmission of axial forces and simultaneously allow rotation movement and radial mobility of the shafts relative to one another. Axial forces, particularly resulting from the helical toothing, can also be transmitted in transmissions having several countershafts.

10 Claims, 4 Drawing Sheets

AXIAL SUPPORT FOR VEHICLE GEARBOXES WITH HELICAL GEAR

BACKGROUND OF THE INVENTION

The invention concerns a vehicle transmission according to the preamble of claim 1.

Modern, powerful vehicle transmissions mostly have a main transmission group with a multi-gear basic transmission and an integrated, front-mounted splitter group and a rear-mounted auxiliary group. They predominantly have a transmission housing with a first shaft, an input shaft and a second shaft, a central shaft or main shaft, which can also be the output shaft, and one or more countershafts. The input shaft and the main shaft are substantially concentric to each other. Such a transmission has been disclosed, for example, in DE 30 49 101 C2.

Taking into consideration the operating characteristics and the noise level, such transmissions can be designed with helical toothing at least for the forward gear range. The axial forces from the helical toothing must be absorbed by an axial support and be diverted toward the housing.

Transmissions of the described designs can be equipped with one countershaft or several countershafts.

In transmissions having power distribution to two countershafts, the main transmission group has two shafts substantially situated axially in tandem where the shaft is either the input shaft or the main shaft of the main transmission is radially and axially firmly supported while the respective other shaft is floatingly supported, that is, radially movable because of the needed balance. Note that an easy radial swiveling movement of the floating shaft is possible.

In transmissions having two countershafts, the load compensation can preferably be arranged so that the input shaft can be supported rigidly relative to the housing, the countershafts rigidly relative to the housing and the main shaft floatingly in the gears which are along the power flow.

In transmissions without power division, both shafts are supported radially and axially in the transmission housing, one shaft being supported on one side in a bearing within the other central shaft.

However, the existing supports have disadvantages that have to be overcome. Especially to be improved is the support of a helically toothed and radially movable shaft in a transmission housing for discharging axial forces toward the housing.

SUMMARY OF THE INVENTION

The problem which the invention solves is to provide, in a vehicle transmission according to the preamble of claim 1, an axial support of the main shaft for absorbing axial forces in the transmission housing.

The problem is solved by the steps stated in claim 1. Developments are the object of subclaims.

The invention proposes different arrangements for axial support of a shaft of a transmission having helical toothing. The axial forces resulting from the helical toothing must be absorbed into the transmission housing. For transmitting axial forces from a second shaft, especially a main shaft, to a substantially coaxial first shaft, especially an input shaft, means are provided which make possible, at the same time, a relative rotational movement of the shafts relative to each other and a radial displacement of both shafts relative to each other. At the same time, in advantageous developments it is possible that the axial force from the main shaft be first transmitted through a support to the input shaft of the transmission and then from the input shaft, through the support thereof, to the housing. One development of the invention shows the means arranged within one gear, to provide a pivot enclosed by axial bearings or gear supports rotarily moved relative to each other. One preferred development provides a disc, radially within the gear, which allows radial movement and on which axial bearings are axially situated on both sides. On the shaft that carries said disc, a ring is provided for transmitting axial forces and for facilitating assembly. In a preferred design, the ring is supported in its position by an elastic component.

Another development shows a sleeve, between the first and the second shafts, upon which or in which means are provided for transmitting axial forces.

Another development has a fastening component, between both shafts, for absorbing axial forces which makes simultaneous rotation and swiveling of both shafts relative to each other possible.

Other developments show a hollow shaft in which the input shaft is situated and which transmits the axial force to the housing, via the input shaft, without a transmission of the axial force.

The possibility of a load compensation is provided by the radial displaceability of both shafts relative to each other. Both substantially coaxial shafts can rotate unhindered relative to each other as long as they are not shifted to form a direct reduction ratio in a torque-transmitting connection. Axial forces result by the use of a helical toothing are transmitted by means, according to the invention, and can be diverted toward the transmission housing.

BRIEF DESCRIPTION OF THE DRAWINGS

The invention is explained in detail with reference to drawings. In the drawings.

DESCRIPTION OF THE PREFERRED EMBODIMENTS

Figure 1:
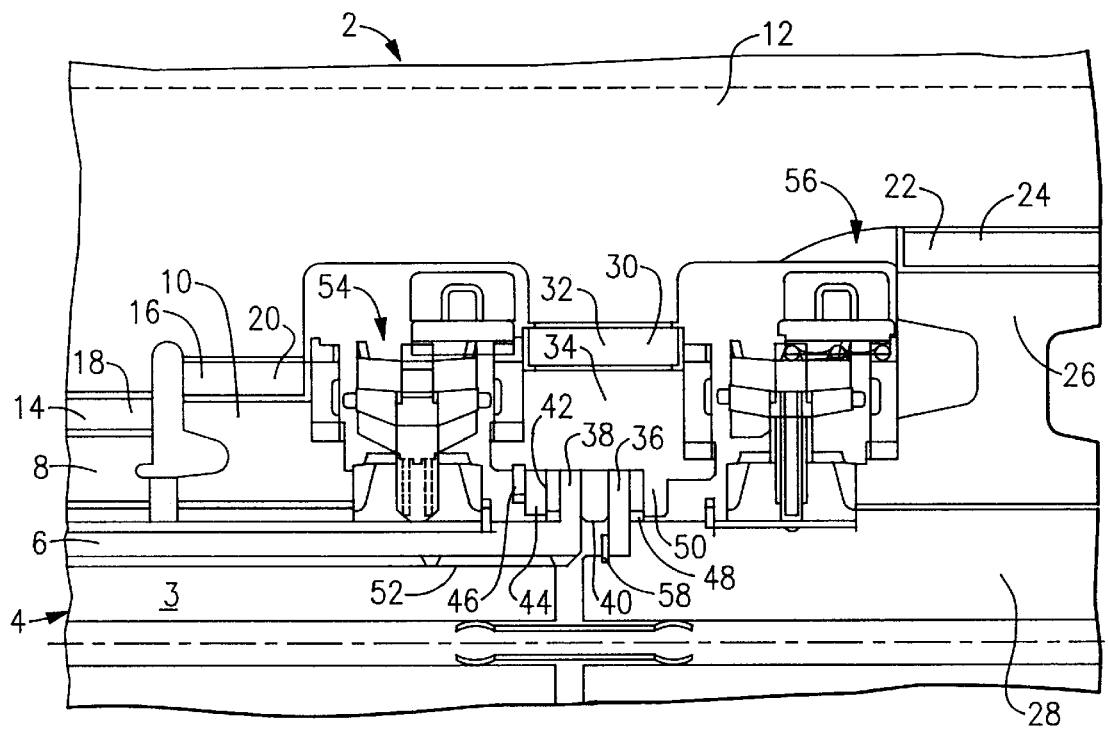
FIG. 1 shows an axial support within a gear.

FIG. 1 shows a segment of a transmission 2. A first shaft 4 has a hollow shaft 6 that surrounds it and forms the input shaft of the transmission 2. Upon the hollow shaft 6 are gears 8, 10 of different reduction steps. The teeth 14, 16 of the gears 8, 10 grip in the teeth 18, 20 of countershaft 12. Another toothing 22 on the countershaft 12 grips in toothing 24 of a gear 26. The gear 26 is connected with a second shaft 28, such as the main shaft of the transmission 2. Another toothing 30 of the countershaft 12 grips in the toothing 32 of another gear 34.

Radially within the gear 34 is a disc 36 which is radially and axially fixed upon the second shaft 28, by a circular edge on the shaft 28 and by a guard ring 58. The end 38 of the hollow shaft 6 facing the disc 36 is bent in such a manner that it is possible to provide, between the end 38 of the hollow shaft 6 and the disc 36, an axial bearing 40 whose freedom of movement is limited radially by the gear 34 and axially by the end 38 of the hollow shaft 6, on one side, and by the disc 36, on the other. Between the end 38 of the hollow shaft 6 and the gear 34 is situated another axial bearing 42, which is axially supported within the gear 34 by a disc 44 and a guard ring 46. Between the disc 36 and the gear 34 is provided another axial bearing 48 which, on the side opposite the disc 36, abuts against a radially inwardly oriented projection 50 of the gear 34. Between the projection 50 and the guard ring 46 there is a system of fastening components 36, 38, 40, 42, 44, 48 which ensures an axial transmission of force between the shafts 4 and 28, makes possible a rotation of both shafts 4 and 28 relative to each other as result of the axial bearings 42, 44 and 48, and ensures radial mobility between the shafts 4 and 28.

The second shaft 28 is supported in the transmission housing in an axially and radially firm bearing, not shown here. The hollow shaft 6, as shown here, is connected with the first shaft 4 by a toothing 52. An actuating device, such as a synchronizer unit 54, is non-rotatably connected with the hollow shaft 6. The first shaft 4 can be optionally connected with the gear 10 or with the gear 34 by said synchronizer unit 54. Likewise, a neutral position between both gears 10 and 34 is possible. Another synchronizer unit 56 is non-rotatably connected with the second shaft 28 and can be actuated to a neutral position or for connection of the second shaft 28 with the gear 26 or with the gear 34. If both the synchronizer unit 54 and the synchronizer unit 56 are shifted to the gear 34, a direct torque flow from the first shaft 4, via the gear 34, to the second shaft 28 is obtained.

Figure 2:
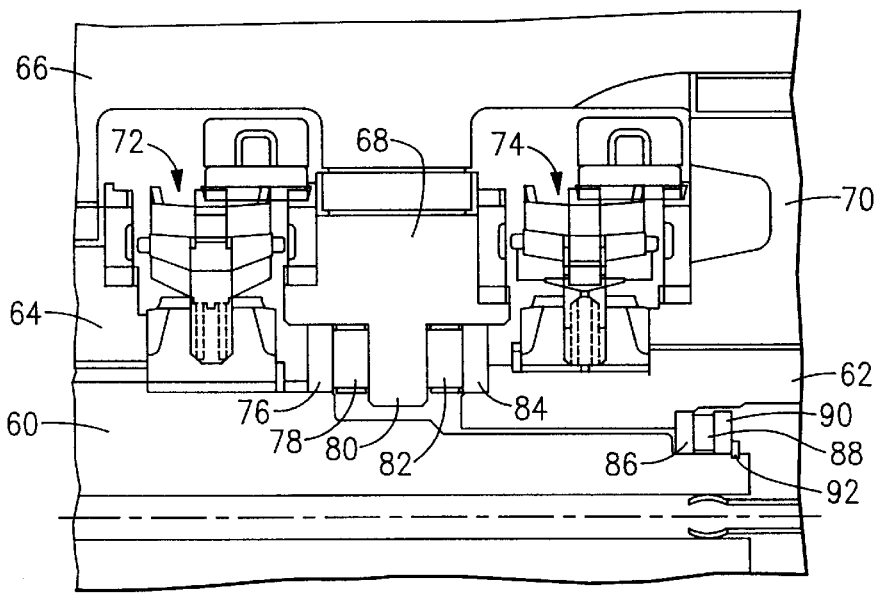
FIG. 2 shows a variant of FIG. 1.

FIG. 2 shows another axial support between a first shaft 60 and a second shaft 62. A gear 64 is rotatably situated upon the first shaft 60 so as to mesh its toothing in the toothing of a countershaft 66. Another toothing of the countershaft 66 meshes in the toothing of a gear 68 which is between both shafts 60 and 62. A third toothing, of the countershaft 66, shown here, meshes in the toothing of another gear 70 which is rotatably situated upon the second shaft 62. A synchronizer unit 72 is between the gears 64 and 68, and a synchronizer unit 74 is between the gears 68 and 70. The synchronizer unit 72 can be actuated to a neutral position, or to alternative connections of the first shaft 60 either with the gear 64 or with the gear 68. The synchronizer unit 74 can be actuated to a neutral position, or to alternative connections of the second shaft 62 either with the gear 68 or with the gear 70. If both the synchronizer unit 72 and the synchronizer unit 74 are shifted to the gear 68, a direct torque flow from the first shaft 60, via the gear 68, to the second shaft 62 is obtained.

The first shaft 60 and the second shaft 62 are axially interconnected by two bearing systems. The first bearing system is formed by a first disc 76, a first roller bearing 78, a pivot 80 formed by the gear 68, a second roller bearing 82, and a second disc 84. The pivot 80 is axially enclosed by both roller bearings 78 and 82. The second bearing system consists of a third disc 86, a third roller bearing 88, and a fourth disc 90. The bearing system is fixed upon the first shaft 60 by a guard ring 92. Both bearing systems create an interconnection of the two shafts 60 and 62 between them. An axial force transmission between the shafts 60 and 62 is ensured, rotation of both shaft 60 and 62 is ensured, rotation of both shaft 60 and 62 relative to each other is made possible because of the axial bearings 78, 82 and 88, and radial mobility between the shafts 60 and 62 is ensured.

Upon a thrust, in a direction toward the first shaft 60, the second shaft 62 supports itself axially on said shaft 60, via the second disc 84, the second roller bearing 82, the pivot 80 of the gear 68, the first roller bearing 78, and the first disc 76.

Upon a thrust, in a direction toward the second shaft 62, the first shaft 60 supports itself in the same manner, via said first bearing system. During a traction load, both shafts 60 and 62 support themselves correspondingly reciprocally via the second bearing system.

Figure 3:
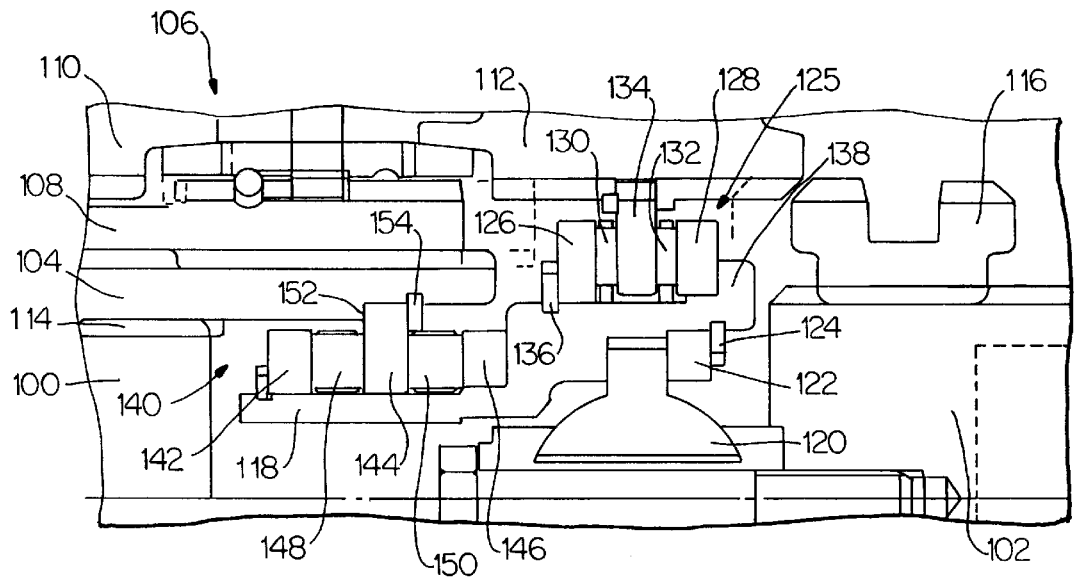
FIG. 3 shows a design with sleeve and movable fastening component.

FIG. 3 shows another axial transmission of force between a first shaft 100 and a second shaft 102. The first shaft 100 is surrounded by a hollow shaft 104. Upon the hollow shaft 104 is situated a synchronizer unit 106 whose sliding sleeve 108 can be shifted to a neutral position or to a torque-transmitting position either between hollow shaft 104 and a first gear 110 or between hollow shaft 104 and a second gear 112. Shaft 100 and hollow shaft 104 are non-rotatably interconnected by a toothing 114 and axially fastened together by a fastening device, not shown here. On the side of the gear 112 remote from the hollow shaft 104 is a dog clutch 116 non-rotatably connected with the shaft 102. Said dog clutch 116 can be interconnected with the gear 112 by means, not shown here, to form a torque-transmitting connection.

A sleeve 118 is axially provided between shaft 100 and shaft 102. The sleeve 118 carries the gear 112 radially and constitutes the axial force-transmitting component between shaft 100 and shaft 102. A fastening component 120 is situated on the shaft 102 which, as shown here, allows a tilting movement of the shaft 102. For easier assembly, the component 120 is mounted with a disc 122 and a guard ring 124 on the sleeve 118. The sleeve 118 radially carries outside a bearing system 125 consisting here of two discs 126 and 128, two roller bearings 130 and 132 and one disc 134 situated between the roller bearings 130 and 132. The bearing system 125 is supported axially upon the sleeve 118 by a guard ring 136 and by a projection 138. The disc 134 supports the gear 112. The discs 126, 128 and 134 form stop faces for the roller bearings 130 and 132.

A second bearing system 140 supports the sleeve 118 on the shaft 100. The bearing system 140 comprises here three discs 142, 144 and 146 of which the central disc 144 is between two roller bearings 148 and 150. The discs 142, 144 and 146 form stop faces for the roller bearings 148 and 150. The disc 144 abuts, in an axial direction, radially within the hollow shaft 104 against a projection 152 and is axially supported by a guard ring 154.

The bearing system 140 does not allow axial movement of the shaft 100 or the hollow shaft 104 relative to the sleeve 118. The sleeve 118 is, likewise, axially firmly attached to the shaft 102 by the fastening component 120. An axial transmission of force between the shafts 100 and 102 is thus obtained without limiting the rotatability of both shafts and the radial mobility relative to each other.

Figure 4:
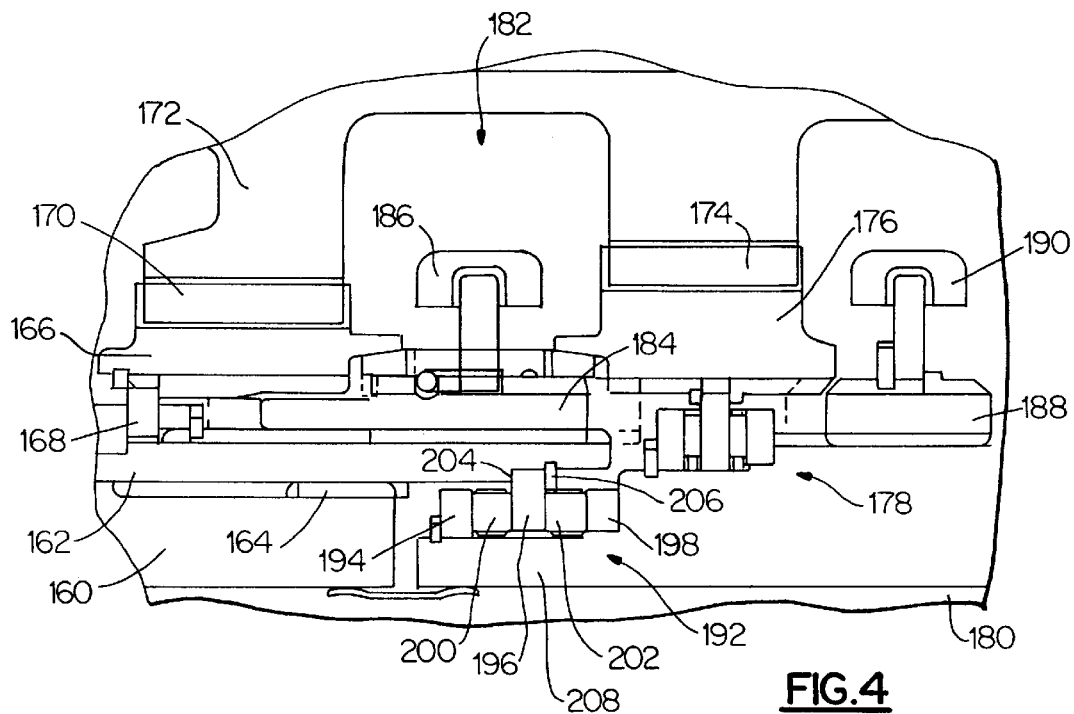
FIG. 4 shows an arrangement with a hollow shaft.

FIG. 4 shows another development of the invention. A first shaft 160 is surrounded by a hollow shaft 162. Shaft 160 and hollow shaft 162 are non-rotatably interconnected by a toothing 164 and axially coupled with each other by a fastening device, not shown here. The hollow shaft 162 carries a disc 168 which, in turn, carries a gear 166 that surrounds the hollow shaft 162. The gear 166 is rotatably connected with a countershaft 172 by a toothing 170. The countershaft 172 is rotatably connected with another gear 176 by another toothing 174. Said gear 176 is supported upon a second shaft 180 by a bearing system 178.

A synchronizer unit 182, with an axially movable sliding sleeve 184, is provided on the hollow shaft 162. The sliding sleeve 184 can be shifted to a neutral position or to a torque-transmitting position either between the hollow shaft 162 and the gear 166, on one side, or between the hollow shaft and the gear 176, on the other. A gearshift fork 186, actuated by a mechanism not shown here, serves for axial movement of the sliding sleeve 184. If the sliding sleeve 184 is shifted in torque-transmitting manner between hollow shaft 162 and gear 176, and if a dog clutch 188 is simultaneously shifted to a torque-transmitting position between the shaft 180 and the gear 176, torque transmission between the first shaft 160 and the second shaft 180 is obtained. A gearshift fork 190, actuated by a mechanism not shown here, serves for the axial movement of the dog clutch 188.

A bearing system 192 is provided radially within the hollow shaft 162 which accomplishes an axial transmission of force between both shafts 160 and 180 without impairing the rotatability relative to each other. The bearing system 192 comprises three discs 194, 196 and 198 of which the central disc 196 is situated between two roller bearings 200 and 202. The discs 194, 196 and 198 form stop faces for the roller bearings 200 and 202. The disc 196 abuts, in an axial direction, radially inside the hollow shaft 162 against a project 204 and is axially supported by a guard ring 206. The bearing system 192 sits on a projection 208 of the shaft 180.

Figure 5:
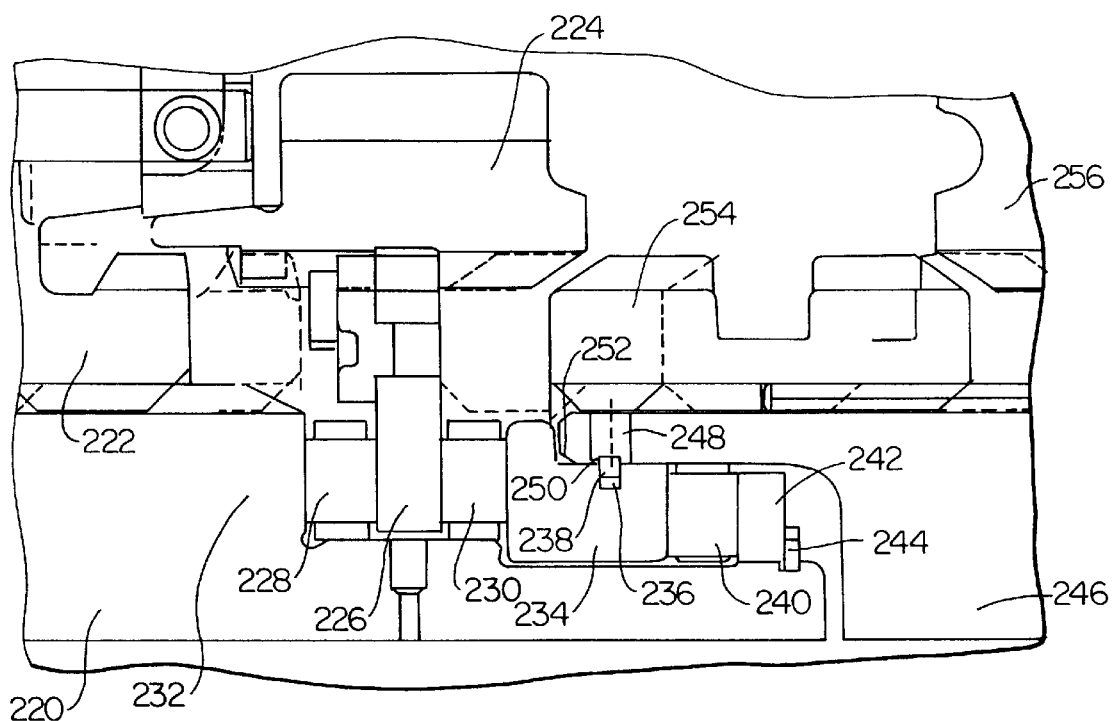
FIG. 5 shows an arrangement for an optimated assembly.

FIG. 5 shows another embodiment. A first shaft 220 carries a sliding sleeve 222, only partly shown here, which besides a neutral position can be shifted to the "right" to a torque-transmitting position between the shaft 220 and a gear 224. The gear 224 is radially supported on the shaft 220 by a disc 226. The disc 226 is axially enclosed by two roller bearings 228 and 230 so the disc 226 and the gear 224 can freely rotate relative to the shaft 220. The disc 226 supports itself axially in one direction, via the roller bearing 228 on a projection 232 of the shaft 220. On the axially opposite side, the disc 226 supports itself, via the roller bearing 230 on a ring 234, which serves as a ring for aiding in the assembly. The ring 234 has a recess 236 in which a guard ring 238 meshes and in which it is guided. The ring 234 is axially held on the side opposite the roller bearing 230 by another roller bearing 240 and a disc 242 abutting there against which, in turn, is fixed on the axle by a guard ring 244. Said guard ring can be yieldably designed in a specially advantageous development.

The ring 234 lies over part of its axial extension radially within a second shaft 246 which has, in the area of the recess 236 of the ring 234, a disassembly opening 248 through which the radially outwardly prestressed guard ring 238 can be radially inwardly pressed. Otherwise the guard ring 238 lies in a recess 250 in the shaft 246, where the dimensions of the recess 250 correspond to those of the recess 236. The shaft 246 carries a dog clutch 254 which is non-rotatably connected with the shaft 246. The dog clutch 254 can be moved to the neutral position, shown here, or to the "left" by a shifting device, not shown here, to a position which makes possible a direct transmission of torque between the first shaft 220 and the second shaft 246, the torque being transmitted by the shaft 220, via the sliding sleeve 222 non-rotatably connected with the shaft 220 and the gear 224, going first to the dog clutch 254 and then to the shaft 246. The dog clutch 254 can be further moved to the "right", away from the neutral position, to form a connection between the shaft 246 and a gear 256, as indicated here.

An axial transmission of force between both shafts 220 and 246 is obtained, via the shown system, consisting of roller bearings 228, 230, 240, discs 226, 242, ring 234 and guard rings 238, 244. The different elasticities of the parts can be compensated by a yieldable design of the guard ring 244.

For assembly, the system described is entirely front-mounted on the first shaft 220. The second shaft 246 slips on said system, with a chamfer 252, at the end of the shaft 246, radially compressing the guard ring 238 until it finally snaps into the shaft 246 when reaching the recess 250. For disassembling shaft 246 from shaft 220, the guard ring 238 is compressed through the disassembling opening 248 so that it can come out of the recess 250 and can remove the axial connection. Each state retains the rotatability and radial mobility of both shafts 220 and 246 relative to each other.

Figure 6:
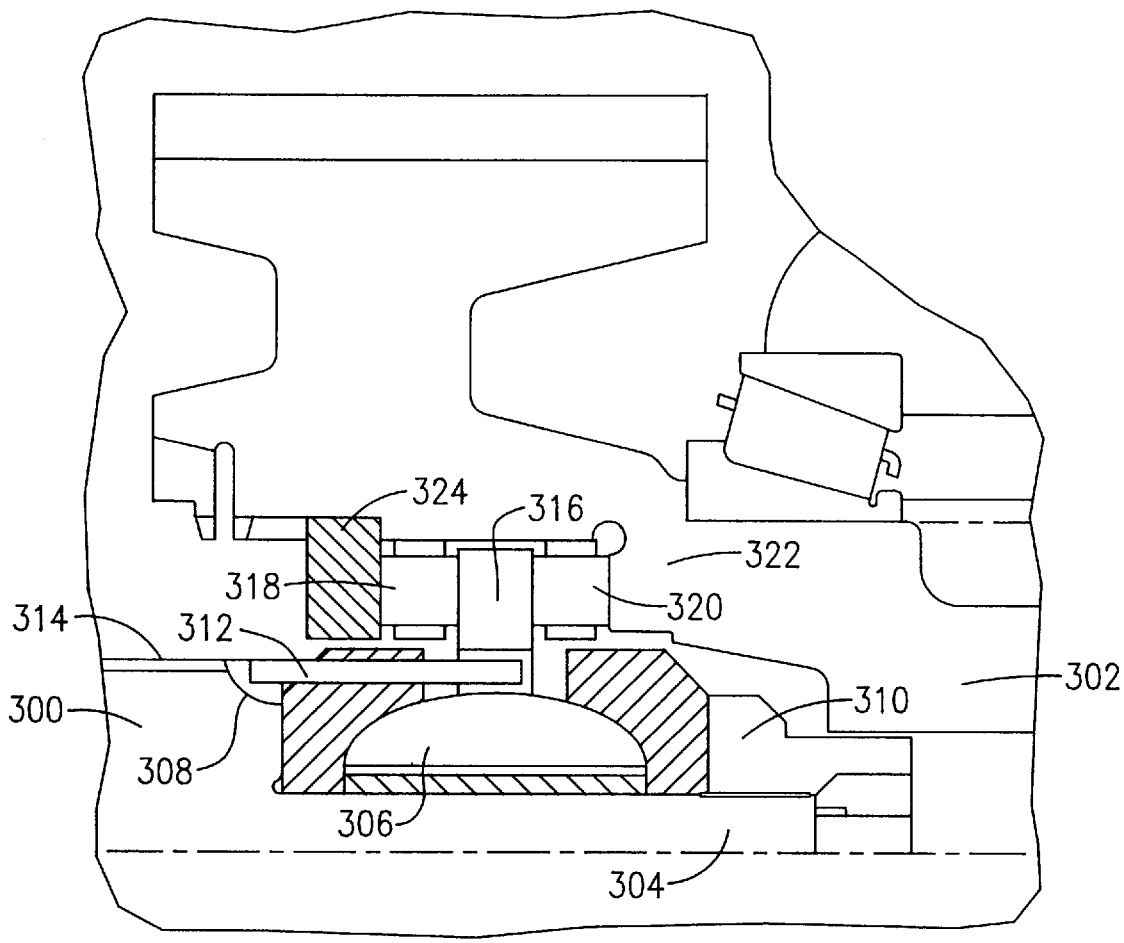
FIG. 6 shows another swiveling design.

Another alternative of an arrangement for axial transmission of force of a first shaft 300 to a second shaft 302 is shown in FIG. 6. On the end 304 of the first shaft 300 is a fastening means of universal ball joint design 306. The fastening means 306 is axially fixed upon the shaft 300 between a projection 308 on the shaft 300 and a support 310. The fastening means 306 is secured against torsions by a pin 312 which meshes, on one side, in the fastening means 306 and, on the other, in a toothing 314 of the shaft 300. The pin 312 is adjusted in the fastening means 306 in a manner such that a tilting of the fastening means 306, in an axial direction of the shafts 300 and 302, is possible to a certain extent. The fastening means 306 has a disc-shaped extension 316 disposed between two roller bearings 318 and 320 and forms a bearing surface for each roller bearing 318 and 320. The second bearing surface for roller bearing 320 is formed by a projection 322 on the second shaft 302 while the second bearing surface for roller bearing 318 is formed by a disc 324 radially within the second shaft 302. The area of the second shaft 302 in which is the bearing system consisting of the discs 316 and 324, projection 322 and roller bearings 318 and 320 of the arrangement according to FIG. 6, is designed as a gear 326, the bearing system being both axially and radially within said gear 326. The disc 324 is axially secured by means not shown in detail here. By the arrangement described, a reliable transmission of axial forces between both shafts 300 and 302 is obtained, and the design of the fastening means 306, as a universal ball joint, ensures movement of the shafts 300 and 302, relative to each other, which is needed for load compensation.

We claim:

1. A vehicle transmission with helical toothing, the vehicle transmission comprising:

a first shaft (4, 60, 100, 104, 160, 162, 220, 300);

a second shaft (28, 62, 192, 180, 246, 302) being coaxial with the first shaft;

a drive mechanism (36–50, 76–84, 120–154, 226, 234, 244, 306) for, when engaged, transmitting rotational forces from said first shaft to said second shaft to provide both simultaneous rotational rotation of said first shaft and said second shaft, relative to one another, and also allow radial displacement of said first shaft and said second shaft relative to one another;

wherein said drive mechanism (36–50, 76–84, 130–134) includes an intermediate gear (34, 68, 112) for transmitting rotational forces from said first shaft to said second shaft;

said intermediate gear (68) is provided with a radially inwardly facing bearing surface (80) which has a tolerance that facilitates radial displacement of the first and second shafts relative to one another, and the bearing surface supports first and second axial bearings (78, 82);

said intermediate gear (68) is additionally supported by at least two gear supports (36, 38), a first one of the at least two gear supports (36) is supported by said first shaft (4) and continuously supports said intermediate gear (68), a second of the at least two gear supports (38) is supported by said second shaft (28) and continuously supports said intermediate gear (68); and the at least two gear supports (36, 38) are separate components from the drive mechanism and the at least two gear supports (36, 38) are rotatable relative to one another.

2. A vehicle transmission according to claim 1, wherein one of said first shaft and second shaft is a hollow shaft (6, 104, 162).

3. A vehicle transmission according to claim 1, wherein said bearing surface (80) is support by a projection which extends radially inward from said intermediate gear (68).

4. A vehicle transmission according to claim 1, wherein a disc (134, 226) is situated radially inwardly of said intermediate gear (112, 224), the disc (134, 226) and the intermediate gear having tolerances facilitating radial movement of said first and second shafts relative to one another, said disc (134, 226) has a first side and a second side, and the first and second axial bearings (78, 82) each engage with one of said first and second sides for rotatably absorbing axial forces.

5. A vehicle transmission according to claim 4, wherein a ring (234) is provided on said first shaft (220) which carries said disc (226), and said ring (234) transmits axial forces, during use, and facilitates assembly of the vehicle transmission.

6. A vehicle transmission according to claim 5, wherein said ring (234) is supported, in an axial direction, between said disc (226) and an elastic component (244), and said ring (234) is rotatable upon said first shaft (220).

7. A vehicle transmission, with helical toothing, comprising:

a first shaft (4, 60, 100, 104, 160, 162, 220, 300);

a second shaft (28, 62, 192, 180, 246, 302) being coaxial with the first shaft; and means (36–50, 76–84, 120–154, 226, 234, 244, 306) for transmitting axial forces from said first shaft to said second shaft to provide both simultaneous rotational movement of said first shaft and said second shaft, relative to one another, and allow radial displacement of said first shaft and said second shaft relative to one another;

wherein a sleeve (118) is provided between said first and said second shafts, and said means (120–154) for transmission of axial forces lies on said sleeve (118).

8. A vehicle transmission according to claim 7, wherein one of said first shaft and second shaft is a hollow shaft (6, 104, 162).

9. A vehicle transmission, with helical toothing, comprising:

a first shaft (4, 60, 100, 104, 160, 162, 220, 300);

a second shaft (28, 62, 192, 180, 246, 302) being coaxial with the first shaft; and means (36–50, 76–84, 120–154, 226, 234, 244, 306) for transmitting axial forces from said first shaft to said second shaft to provide both simultaneous rotational of said first shaft and said second shaft, relative to one another, and allow radial displacement of said first shaft and said second shaft relative to one another;

wherein a fastening component (120, 306) is situated between said first shaft and said second shafts for absorbing axial forces, and said fastening component (120, 306) facilitates rotation and tilting of said first and said second shafts relative to one another.

10. A vehicle transmission according to claim 9, wherein one of said first shaft and second shaft is a hollow shaft (6, 104, 162).

* * * * *